(12) United States Patent
Yuan et al.

(10) Patent No.: US 8,143,756 B2
(45) Date of Patent: Mar. 27, 2012

(54) COOLING FAN WITH QUICK ASSEMBLING STRUCTURE

(75) Inventors: Mei-Hua Yuan, Sinjhuang (TW); Li-Hua Li, Sinjhuang (TW)

(73) Assignee: Asia Vital Components Co., Ltd., Taipei County (TW)

( * ) Notice: Subject to any disclaimer, the term of this patent is extended or adjusted under 35 U.S.C. 154(b) by 246 days.

(21) Appl. No.: 12/371,690

(22) Filed: Feb. 16, 2009

(65) Prior Publication Data
US 2010/0207469 A1 Aug. 19, 2010

(51) Int. Cl.
*H02K 5/16* (2006.01)
(52) U.S. Cl. ............................................ 310/90; 310/91
(58) Field of Classification Search ........................ None
See application file for complete search history.

(56) References Cited

U.S. PATENT DOCUMENTS

| | | | |
|---|---|---|---|
| 4,554,491 A | | 11/1985 | Plunkett |
| 5,099,181 A | | 3/1992 | Canon |
| 5,436,519 A | * | 7/1995 | Takahashi et al. ..... 310/216.114 |
| 5,610,462 A | * | 3/1997 | Takahashi ........................ 310/90 |
| 6,654,213 B2 | * | 11/2003 | Horng et al. ..................... 361/23 |
| 2006/0043802 A1 | * | 3/2006 | Sugiyama et al. .......... 310/67 R |
| 2007/0120433 A1 | * | 5/2007 | Sugiyama et al. .............. 310/90 |
| 2008/0157634 A1 | * | 7/2008 | Sekiguchi et al. .......... 310/67 R |

* cited by examiner

*Primary Examiner* — Quyen Leung
*Assistant Examiner* — Eric Johnson (57) ABSTRACT

A cooling fan includes a base having a hollow bearing cup for receiving a bearing therein, a motor winding support mounted to a top of the bearing cup, and a blade hub mounted atop the motor winding support. The bearing cup is externally provided with channels and stop portions communicating with the channels. Each of the stop portions includes a recess and a projection. The motor winding support is internally provided with stoppers corresponding to the stop portions. Each of the radial stoppers includes a raised portion for engaging with the recess, and a sideward extended portion for abutting on a bottom of the projection. The motor winding support can be rotated to lock to the bearing cup through engagement of the stop portions with the radial stoppers. No glue dispensing is needed, and the problems of a deformed bearing and noise during fan operation are avoided.

5 Claims, 11 Drawing Sheets

COOLING FAN WITH QUICK ASSEMBLING STRUCTURE

FIELD OF THE INVENTION

The present invention relates to a cooling fan, and more particularly to a cooling fan assembling structure that avoids a deformed bearing caused by an interference fit relation between a fan motor and the bearing and saves the material and labor costs for dispensing glue on the bearing and forcing the fan motor onto a bearing cup.

BACKGROUND OF THE INVENTION

Various kinds of electronic information products, such as computers, are now widely adopted and applied in different commercial and industrial fields. To meet consumers' demands, electronic information products have been designed to have high operating speed and increased access capacity. However, components in the electronic information products would produce a high amount of heat when they operate at high speed.

For example, among others; the central processing unit (CPU) of a computer produces the largest part of heat in the computer. When the heat produced by the CPU gradually increases, the computer would have reduced performance. And, when the produced heat has accumulated in the computer to exceed an allowable limit, the computer is subject to the danger of shutdown or even becoming seriously damaged. Moreover, to solve the problem of electromagnetic radiation, a case is usually used to enclose all the important computer components and elements therein. Therefore, it is a very important matter to quickly dissipate the heat produced by the CPU and other heat-producing elements in the computer case.

A common way to dissipate the heat produced by the CPU is to mount a heat sink and a cooling fan atop the CPU. The heat sink has a first side formed with a plurality of radiating fins. An opposite second side of the heat sink without the radiating fins is in direct contact with the CPU, so that heat produced by the CPU is absorbed by the heat sink at the second side contacting with the CPU and then transferred to the radiating fins at the first side and finally radiated from the radiating fins into ambient air. And, the cooling fan produces airflows to carry away hot air around the CPU and the heat sink, so as to achieve the purpose of quick heat dissipation.

Figure 1:
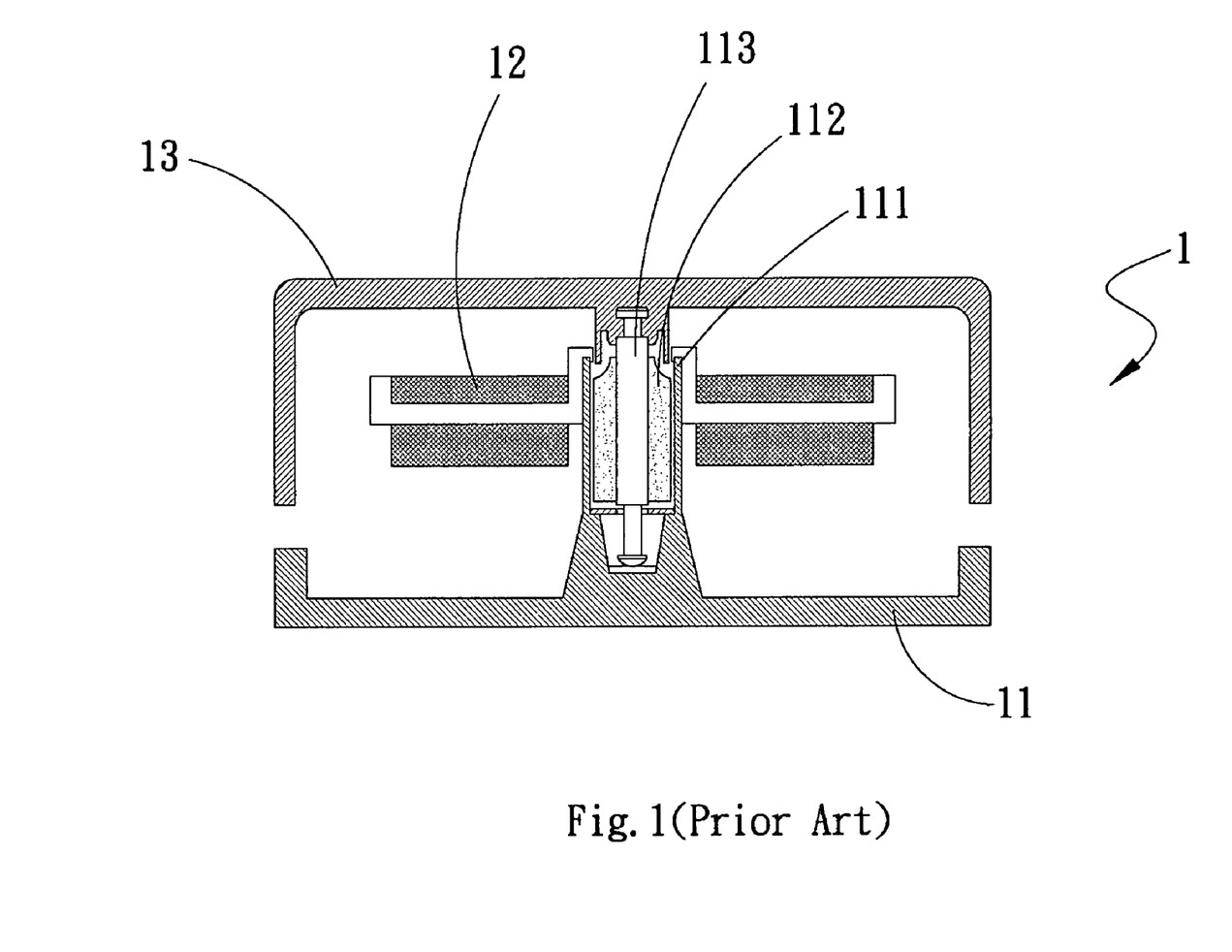
FIG. 1 is an assembled sectional view of a conventional cooling fan.

FIG. 1 is a sectional view of a conventional cooling fan 1, which includes a base 11, a motor 12, and a blade hub 13. The base 11 mainly has a bearing cup 111 formed thereon for receiving a bearing 112 therein. A rotary shaft 113 is extended through the bearing 112, and the motor 12 is externally fitted around the bearing cup 111 in a tight fit relation. The blade hub 13 is then mounted atop the motor 12 and the bearing 112. The rotary shaft 113 has an end pivotally turnably fitted in a rear center of the blade hub 13, so that the blade hub 13 is rotatably connected to the bearing via the rotary shaft 113. When the motor 12 is assembled to the bearing cup 111, the motor 12 is in an interference fit relation with the bearing 112. Before the motor 12 is interference-fitted to the bearing 112, there is a glue dispensing procedure to apply a catalyst and glue on an outer wall surface of the bearing 112. Thereafter, a motor compressing procedure is performed to force the motor 12 onto an outer side of the bearing 112, so that the motor 12 is connected to the bearing cup 111 by way of interference fit. With the motor 12 connected to the bearing cup 111 by way of interference fit, the bearing cup 111 tends to compress against the bearing 112 received therein and causes deformation of the bearing 112 as well as noise during the operation of the cooling fan.

In brief, the conventional cooling fan, due to its assembling structure, has the following disadvantages: (1) requiring an additional glue dispensing procedure; (2) requiring to tight fit the motor around the bearing cup; (3) tending to cause deformation of the bearing; and (4) tending to cause noise during the operation of the cooling fan.

It is therefore tried by the inventor to develop a cooling fan with quick assembling structure to overcome the problems in the conventional cooling fan.

SUMMARY OF THE INVENTION

A primary object of the present invention is to provide a cooling fan with quick assembling structure, so that a motor winding support can be easily assembled to a bearing cup through a rotate and lock movement without the need of conventional glue dispensing and motor compressing procedures.

Another object of the present invention is to provide a cooling fan with quick assembling structure, so that a motor winding support can be easily assembled to a bearing cup through engagement of stop portions with radial stoppers without the risk of compressing the bearing cup against a bearing received therein to cause deformation of the bearing and noise during fan operation.

To achieve the above and other objects, the cooling fan with quick assembling structure according to a preferred embodiment of the present invention includes a base, a motor winding support, and a blade hub. The base has a bearing cup provided thereon for receiving a bearing therein. The bearing cup is provided on an outer wall surface with at least one axially extended channel, and at least one stop portion communicating with the channel and including a recess and a projection. The motor winding support is mounted to a top of the bearing cup, and is provided with an axially downward extended central wall and a top board; the downward extended central wall being fitted on and around an upper end of the bearing cup. The top board touches the upper end of the bearing cup. The central wall of the motor winding support defines a central bore and is provided on an inner wall surface with at least one radially inward stopper, which includes a raised portion for correspondingly engaging with the recess of the stop portion on the bearing cup and a sideward extended portion for correspondingly abutting on a bottom of the projection of the stop portion. The blade hub is mounted atop the motor winding support and includes a rotary shaft, which is extended through the central bore of the motor winding support into the bearing cup and through the bearing.

The cooling fan according to the present invention with the above arrangements has the following advantages: (1) saving the material and labor costs for dispensing glue on the outer surface of the bearing; (2) avoiding the problem of a deformed bearing; and (3) avoiding the problem of noise during the operation of the cooling fan.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Please refer to FIGS. 2, 3, 3A, 4, and 4A. A cooling fan with quick assembling structure 2 according to a preferred embodiment of the present invention includes a base 3, a motor winding support 4, and a blade hub 5.

Figure 4:
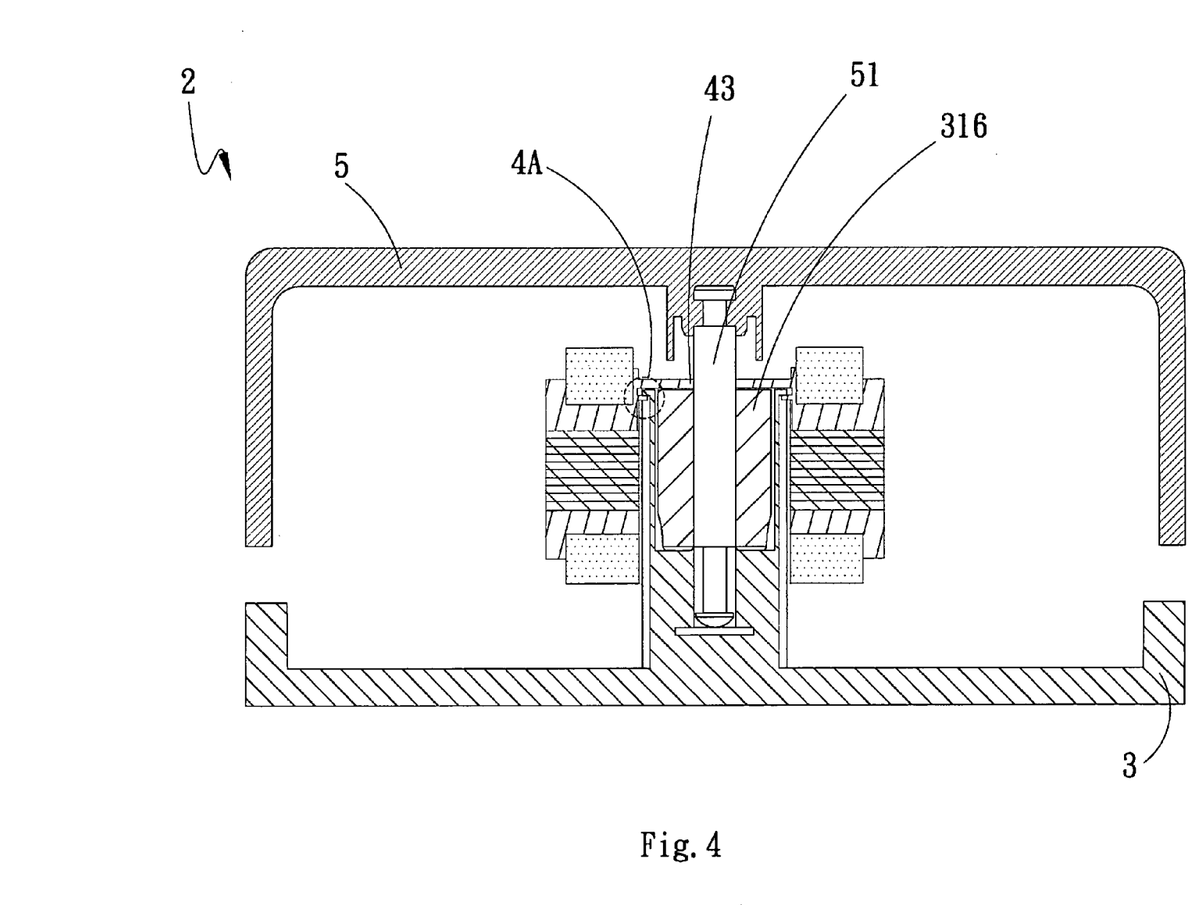
FIG. 4 is an assembled sectional view of the cooling fan of the present invention.
Figure 4A:
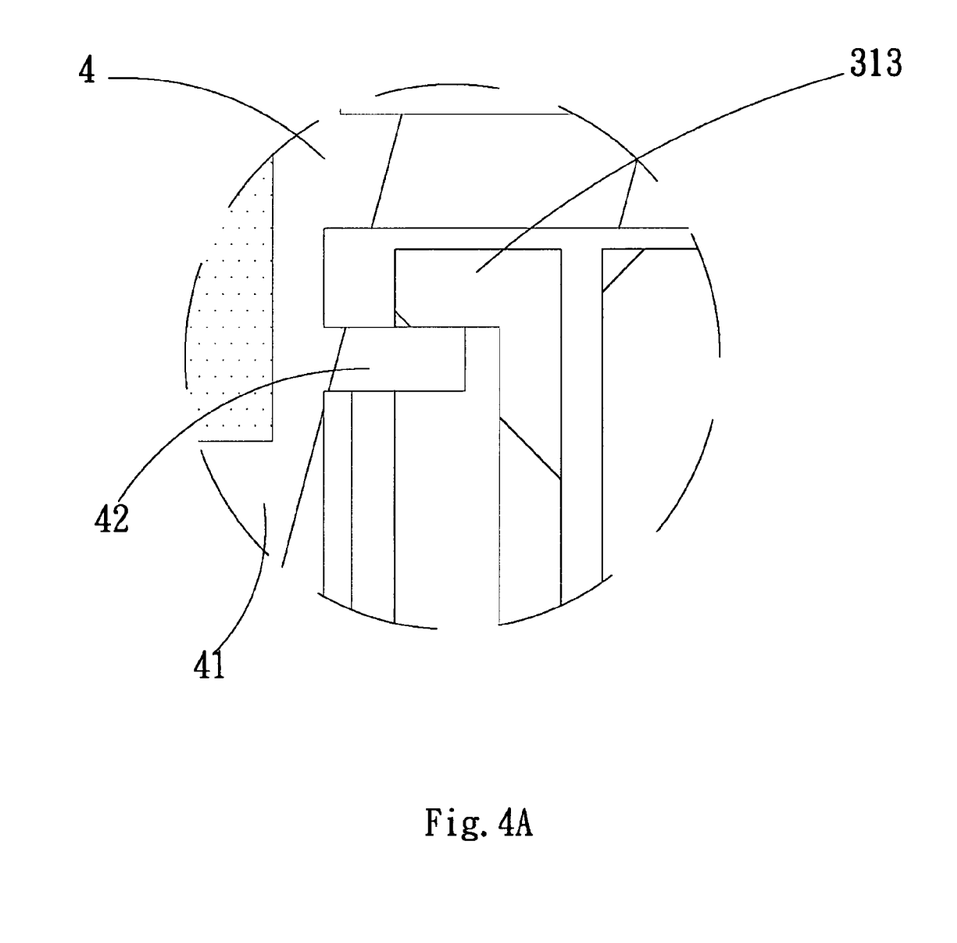
FIG. 4A is an enlarged view of the circled area 4A in FIG. 4.
Figure 5:
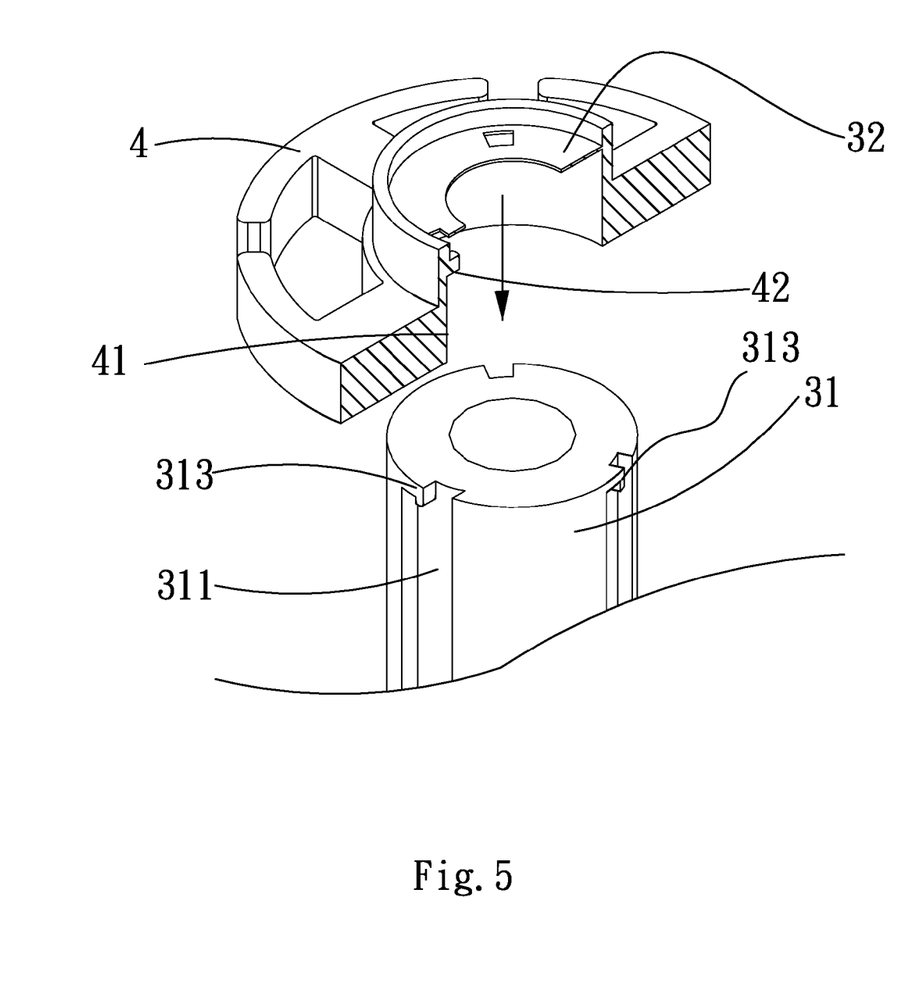
FIG. 5 is a fragmentary, exploded cut away view showing the mounting of a motor winding support to an upper end of a bearing cup of the cooling fan of the present invention.
Figure 6:
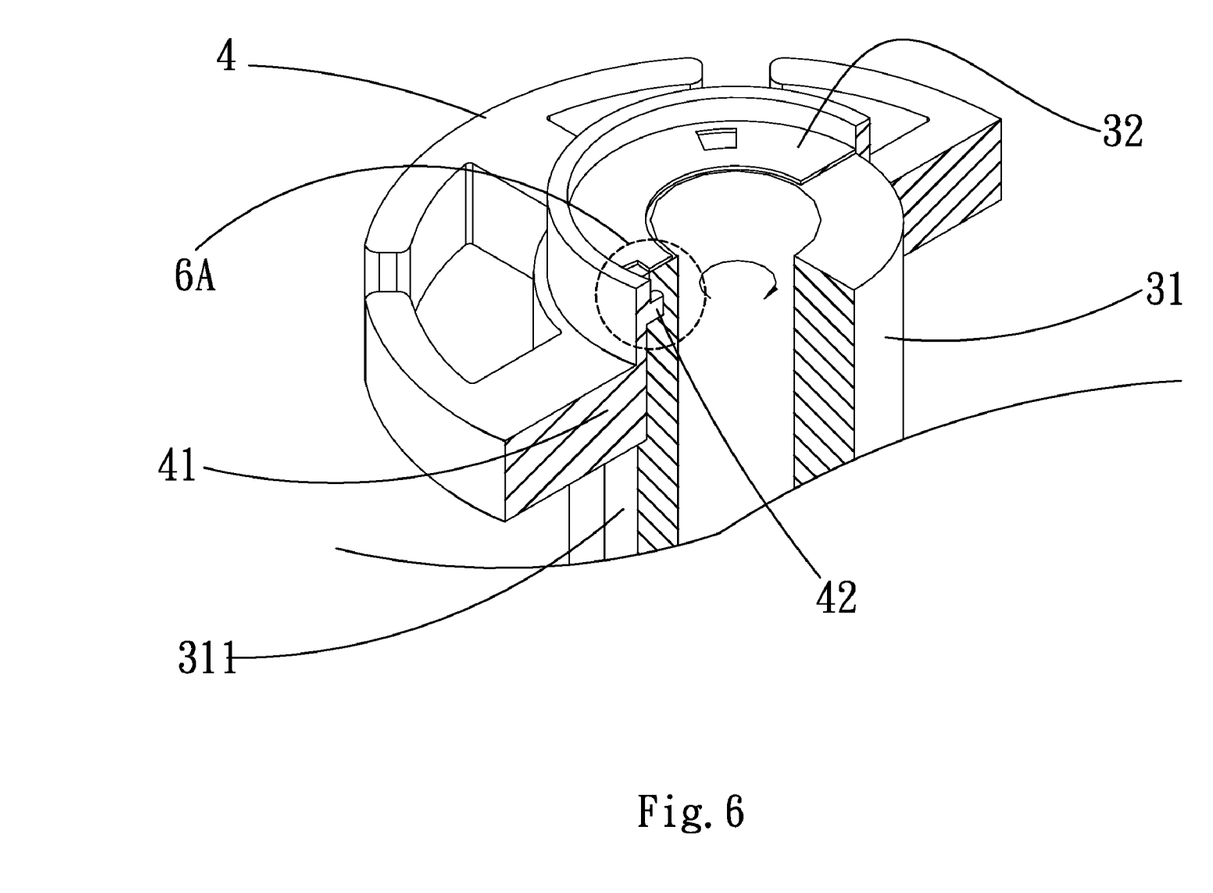
FIG. 6 is an assembled view of FIG. 5 showing the motor winding support having been mounted to the upper end of the bearing cup is rotated.
Figure 6A:
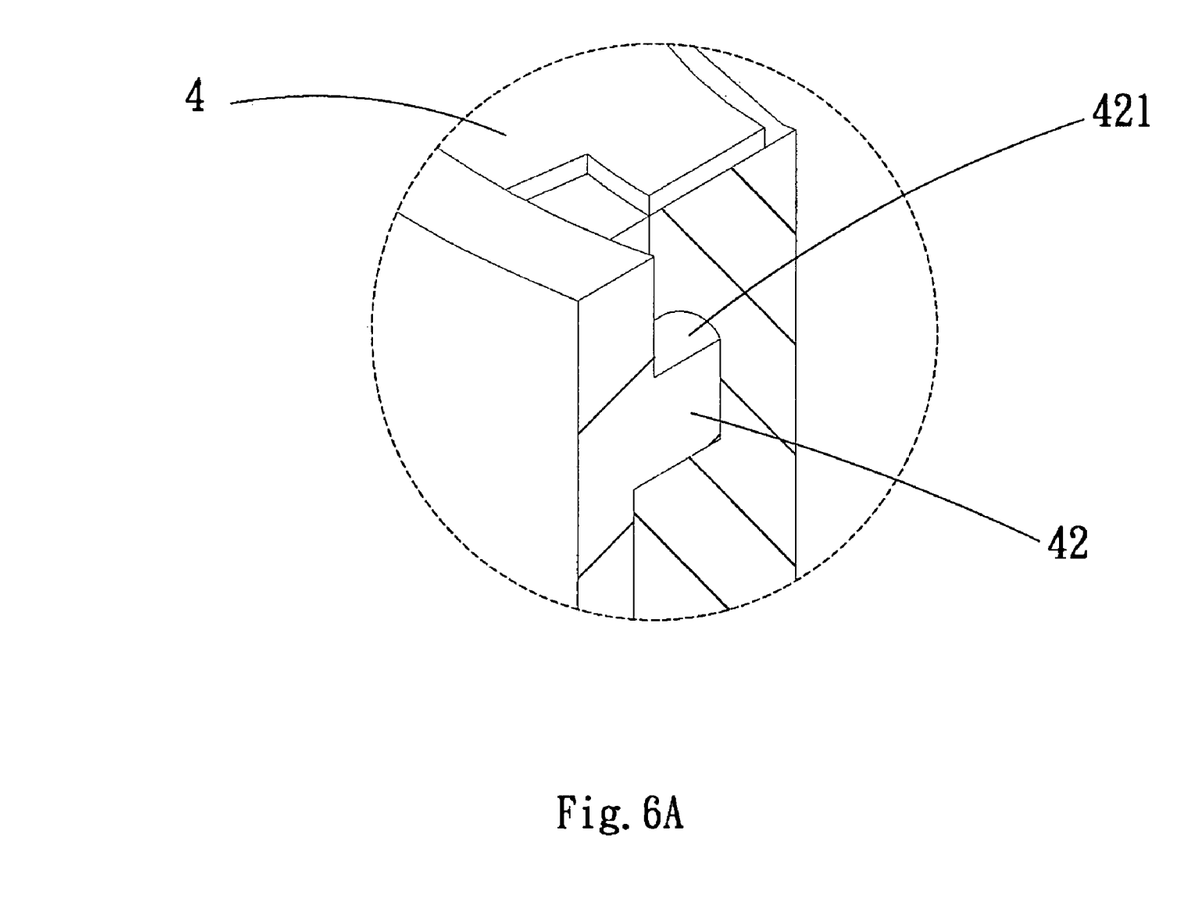
FIG. 6A is an enlarged view of the circled area 6A in FIG. 6.

The base 3 can be mounted in a fan housing (not shown) or to a heat sink (not shown), and includes a centered hollow bearing cup 31 for receiving a bearing 316 therein, as shown in FIG. 4. The bearing cup 31 is provided on an outer wall surface with a plurality of axially extended and equally spaced channels 311, each of which extends a full length of the bearing cup 31 from top to bottom with an open upper end and an open lower end 312. The open lower ends 312 of the channels 311 allow the bearing cup 31 to release from a mold during the manufacturing process thereof. The bearing cup 31 is provided at an upper end of its wall at positions communicating with the channels 311 with a stop portion 313 each, which consists of a recess 314 and a projection 315, as can be most clearly seen in FIG. 3A.

Figure 2:
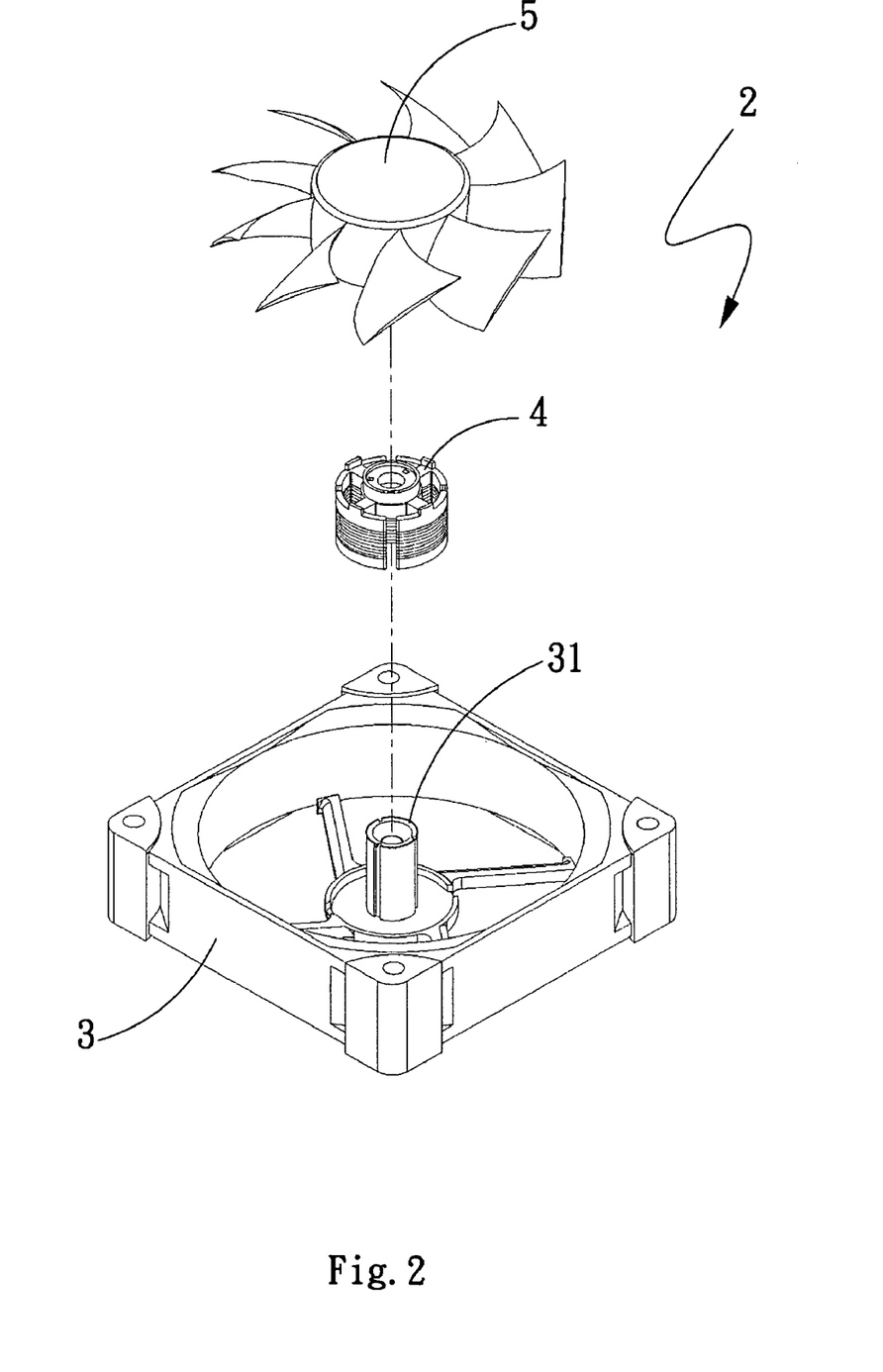
FIG. 2 is an exploded perspective view of a cooling fan with quick assembling structure according to a preferred embodiment of the present invention.
Figure 3:
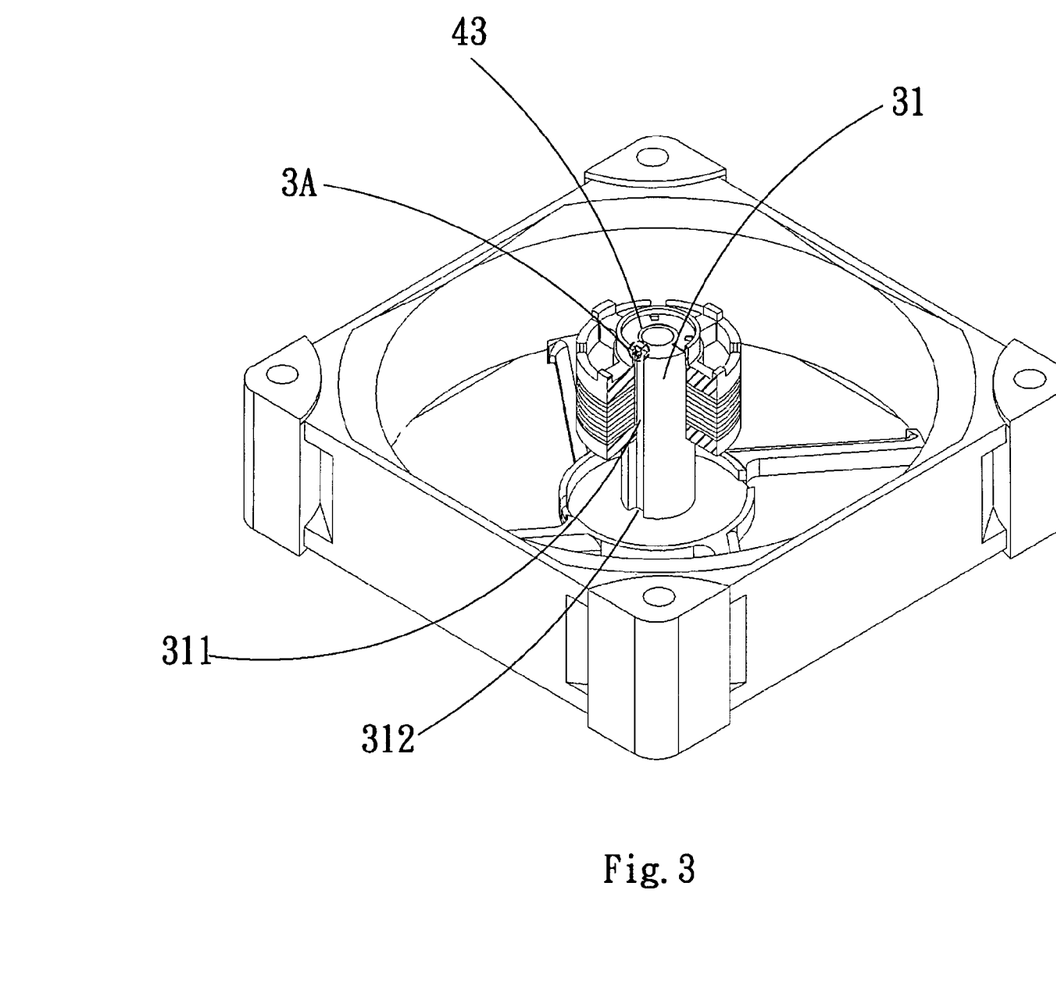
FIG. 3 is an assembled cutaway view of the cooling fan of FIG. 2 with the blade hub removed therefrom.
Figure 3A:
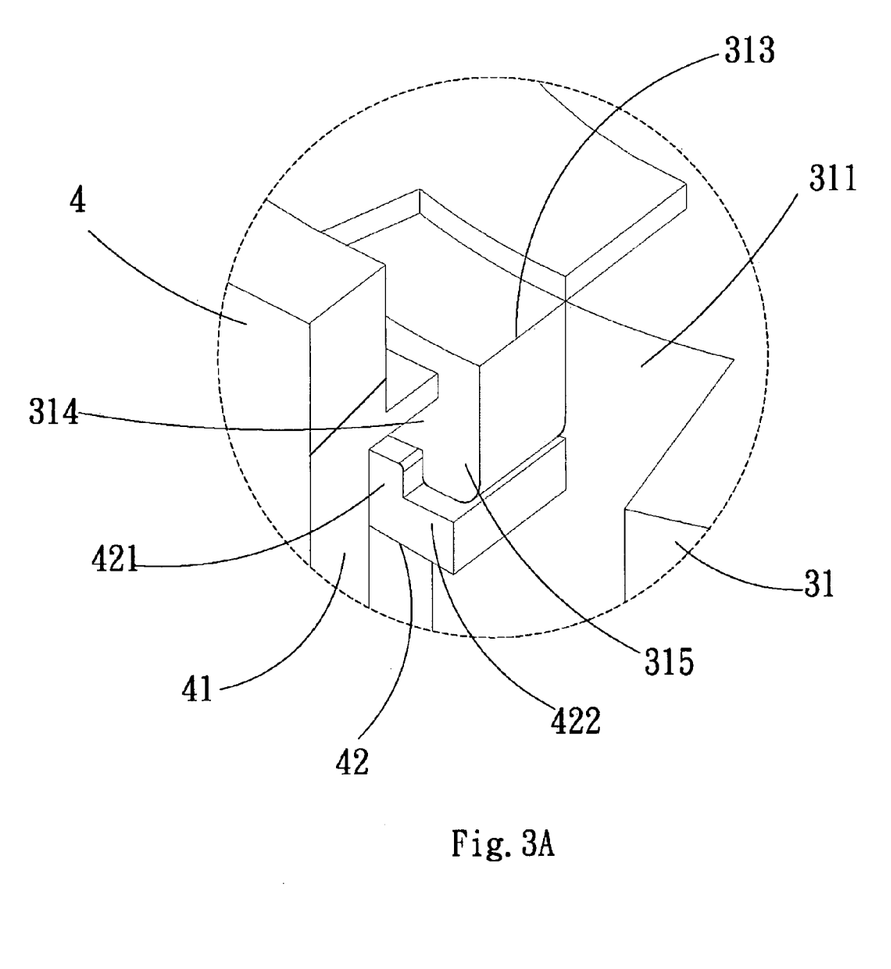
FIG. 3A is an enlarged view the circled area 3A in FIG. 3.

The motor winding support 4 is located on a top board 32 of the bearing cup 31, and includes an axially downward extended central wall 41 for fitting around the upper end of the bearing cup 31. A plurality of radially inward extended stopper 42 is formed and spaced on an inner wall surface of the central wall 41. Each of the radial stoppers 42 includes a raised portion 421 and a sideward extended portion 422. The motor winding support 4 defines a central bore 43.

The blade hub 5 is mounted atop the motor winding support 4 and includes a rotary shaft 51, which is extended through the central bore 43 of the motor winding support 4 into the bearing cup 31 to fixedly associate with the bearing 316.

Please refer to FIGS. 4 through 7A. The bearing cup 31 is formed with a mold, so that the channels 311 are axially formed on the outer wall surface of the bearing cup 31 and the stop portions 313 are formed on the upper end of the channels 311 of the bearing cup 31. The bearing cup 31 can be released from the mold during the manufacturing process thereof via the open lower ends 312 of the channels 311, as shown in FIG. 3. When the motor winding support 4 is mounted to the top of the bearing cup 31, the axially downward extended central wall 41 of the motor winding support 4 is fitted on and around the upper end of the bearing cup 31. At this point, the radial stoppers 42 on the inner wall surface of the central wall 41 are correspondingly extended into the channels 311 and can slide downward along the channels 311. When the motor winding support 4 is in contact with the upper end of the bearing cup 31, the motor winding support 4 can be rotated relative to the bearing cup 31, so that the raised portions 421 of the radial stoppers 42 are sidewardly pressed against the projections 315 of the stop portions 313 to become deformed by a certain degree, allowing the raised portions 421 to move into the recesses 314 of the stop portions 313. The raised portions 421 will then restore to their original shape when they have moved into the recesses 314 to thereby be firmly held in the recesses 314. At this point, the sideward extended portions 422 will firmly abut on a bottom of the projections 315 of the stop portions 313, and the motor winding support 4 will be tightly locked to the bearing cup 3 without the need of applying glues on the outer surface of the bearing 316. Therefore, costs for the glue dispenser, the glue, and gluing labor can be saved.

Figure 7:
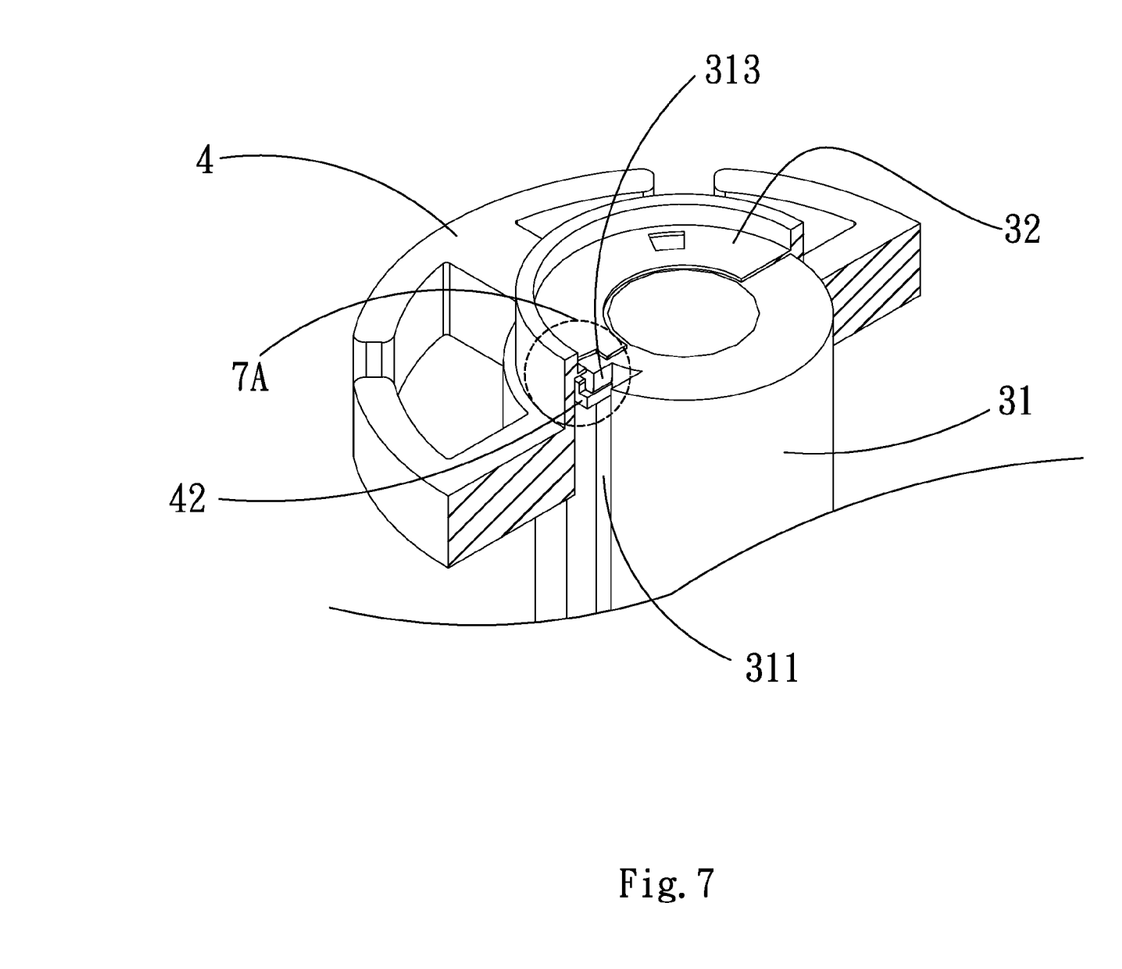
FIG. 7 is a fragmentary, assembled cutaway view showing the rotated motor winding support is locked to the bearing cup of the cooling fan of the present invention.
Figure 7A:
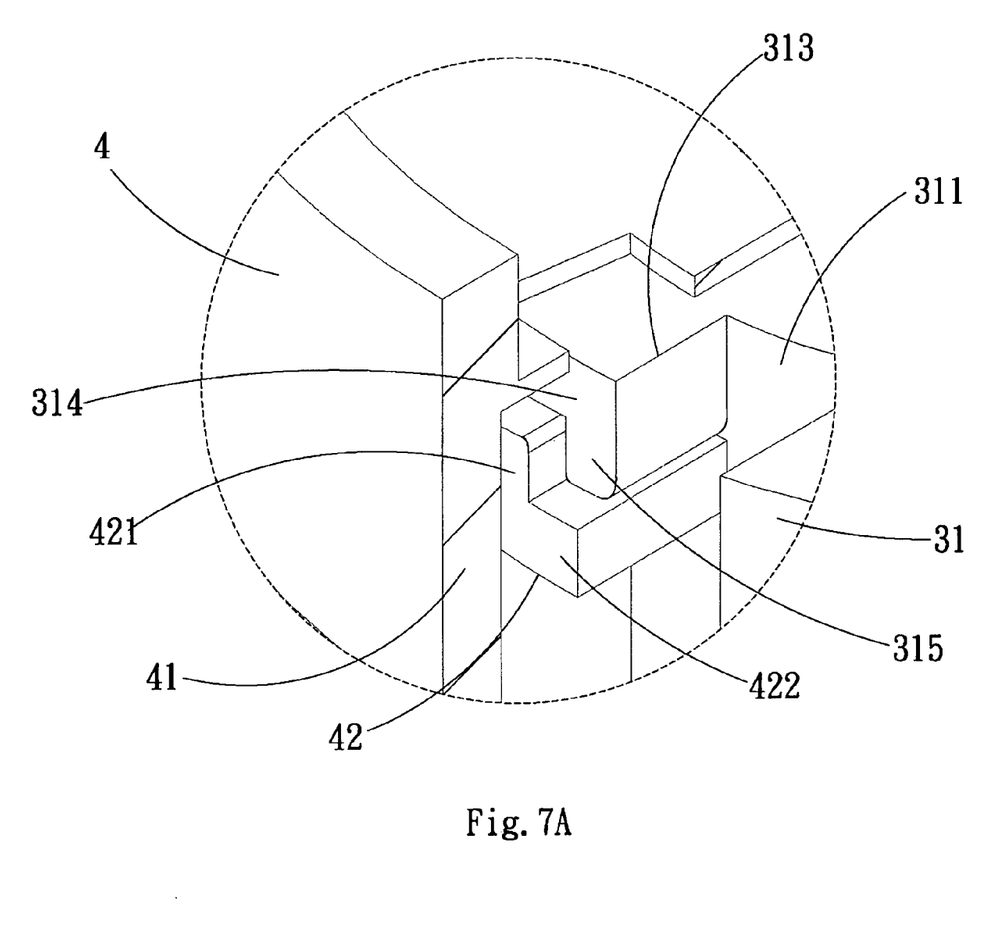
FIG. 7A is an enlarged view of the circled area 7A in FIG. 7.

When the blade hub 5 is mounted atop the motor winding support 4, the rotary shaft 51 is extended through the central bore 43 of the motor winding support 4 and the bearing 316. The motor winding support 4 is tightly locked to the bearing cup 31 through the engagement of the radial stoppers 42 with the stop portions 313 without compressing the bearing cup 31 against the bearing 316 inside the bearing cup 31 to cause a deformed bearing 316, and noise during the operation of the cooling fan 2 can be avoided. That is, the cooling fan 2 can be easily assembled for operation simply through the engagement of the radial stoppers 42 with the stop portions 313.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A cooling fan with quick assembling structure, comprising:
    a base having a bearing cup,
    at least one axially extended channel extending a full length of the bearing cup from a top to a bottom formed on an outer wall surface of the bearing cup, and at least one stop portion formed at an upper end of the bearing cup communicating with the at least one channel and consisting of a recess and a projection;
    a motor winding support being mounted to a top of the bearing cup, and having a downward extended central wall and a top board; the downward extended central wall being fitted on and around the upper end of the bearing cup, and the top board touching the upper end of the bearing cup; and the central wall being provided on an inner wall surface with at least one radially inward extended stopper for engaging with the at least one stop portion on the bearing cup; and
    a blade hub being mounted atop the motor winding support and including a rotary shaft extended through the motor winding support into the bearing cup.

2. The cooling fan with quick assembling structure as claimed in claim 1, wherein the bearing cup has a bearing received therein, and the rotary shaft of the blade hub extended into the bearing cup being extended through the bearing.

3. The cooling fan with quick assembling structure as claimed in claim 1, wherein the radial stopper includes a raised portion for correspondingly engaging with the recess on the stop portion formed on the upper end of the bearing cup.

4. The cooling fan with quick assembling structure as claimed in claim 1, wherein the radial stopper includes a sideward extended portion for correspondingly abutting on a bottom of the projection on the stop portion formed on the upper end of the bearing cup.

5. The cooling fan with quick assembling structure as claimed in claim 1, wherein the motor winding support defines a central bore in the central wall, and the rotary shaft of the blade hub being extended through the motor winding support via the central bore.

\* \* \* \* \*